United States Patent [19]

Maas et al.

[11] 4,405,490

[45] Sep. 20, 1983

[54] ANTI-FOAM FORMULATION CONTAINING AN ORGANOPOLYSILOXANE

[75] Inventors: Joachim Maas, Bergheim; Helmut Steinberger, Leverkusen; Hans-Heinrich Moretto, Cologne, all of Fed. Rep. of Germany

[73] Assignee: Bayer Aktiengesellschaft, Leverkusen, Fed. Rep. of Germany

[21] Appl. No.: 249,253

[22] Filed: Mar. 30, 1981

[30] Foreign Application Priority Data

Apr. 11, 1980 [DE] Fed. Rep. of Germany ....... 3013923

[51] Int. Cl.$^3$ ................................................ C09K 3/00
[52] U.S. Cl. ..................................... 252/358; 252/321
[58] Field of Search ............................... 252/321, 358; 106/287.14

[56] References Cited

U.S. PATENT DOCUMENTS

| | | | |
|---|---|---|---|
| 3,250,727 | 5/1966 | Noll | 252/358 |
| 3,784,479 | 1/1974 | Keil | 252/358 |
| 4,052,331 | 10/1977 | Dumoulin | 252/312 |
| 4,274,977 | 6/1981 | Koerner | 252/358 |

FOREIGN PATENT DOCUMENTS

| | | |
|---|---|---|
| 1419678 | 12/1968 | Fed. Rep. of Germany . |
| 2829906 | 3/1979 | Fed. Rep. of Germany . |
| 1224026 | 3/1971 | United Kingdom . |
| 1315910 | 5/1973 | United Kingdom . |
| 1348751 | 3/1974 | United Kingdom . |
| 1505665 | 3/1978 | United Kingdom . |

*Primary Examiner*—John C. Bleutge
*Assistant Examiner*—Patricia Short
*Attorney, Agent, or Firm*—Sprung, Horn, Kramer & Woods

[57] ABSTRACT

An anti-foam composition comprising
(a) a dispersion of a silicon dioxide filler in an organopolysiloxane,
(b) an emulsifier or dispersant, and
(c) at least one water soluble compound selected from the group consisting of
  (i) a divalent aliphatic alcohol containing 4 to 10 carbon atoms,
  (ii) a trivalent aliphatic alcohol containing 2 to 10 carbon atoms, and $$R_1O(-CH_2-CH_2-O)_nR_2, \qquad (iii)$$

$$R_1O(-CH_2-CH-O)_mR_2,$$
$$\qquad\qquad\quad\; | \qquad\qquad\;\;$$
$$\qquad\qquad\;\; CH_3$$

$$R_1O(-CH_2-CH_2-CH_2-O)_nR_2 \text{ and}$$

$$R_1O(-CH_2-CH_2-O)_p(CH_2-CH-O)_rR_2$$
$$\qquad\qquad\qquad\qquad\qquad\qquad\qquad |$$
$$\qquad\qquad\qquad\qquad\qquad\qquad\;\; CH_3$$

in which
 $R_1$ and $R_2$ each independently is hydrogen, $C_{1-8}$-alkyl or $C_{1-8}$-alkyl-CO-, and
 n,m,p and r are so chosen that the molecular weight of (c) does not exceed 499.

Advantageously, based upon (a) plus (b) plus (c) the composition by weight comprises about 25 to 35% (a), about 8 to 12% (b) and about 53 to 67% (c), the composition additionally containing water in up to about 45% by weight of the entire composition. The composition is more readily water-dispersible and of better anti-foaming action than heretofore.

6 Claims, No Drawings

ANTI-FOAM FORMULATION CONTAINING AN ORGANOPOLYSILOXANE

The invention relates to an improved anti-foam formulation which essentially consists of water-soluble glycols, an SiO$_2$ dispersion in a polysiloxane, emulsifiers and, optionally, water.

It is known to prepare anti-foam formulations from methylpolysiloxane, finely divided filler, water and emulsifiers (compare, for example, German Patent Specification No. 1,067,003, German Offenlegungsschrift No. 1,914,684 and German Offenlegungsschrift No. 2,626,942). These known emulsions however exhibit considerable disadvantages, above all in respect of their anti-foam activity.

Siloxane-polyoxyalkylene copolymers have also been proposed as anti-foam agents compare, for example, German Offenlegungsschrift No. 2,123,573, German Offenlegungsschrift No. 2,251,171, German Offenlegungsschrift No. 2,233,818, U.S. Pat. No. 3,951,832, U.S. Pat. No. 3,712,868 and U.S. Pat. No. 3,233,986). However, the preparation of such siloxane-polyoxyalkylene copolymers entails considerable expense. It was possible to reduce this somewhat by using free polyoxyalkylene glycols or their derivatives instead of the siloxane-polyoxyalkylene copolymers. Thus, for example, Belgian Patent Specification No. 713,652 describes the use of water-soluble glycols, for example polypropylene glycols. German Offenlegungsschrift No. 1,444,442 and German Offenlegungsschrift No. 2,112,579, as well as German Offenlegungsschrift No. 2,829,909, use water-insoluble glycols for the preparation of anti-foam compositions. German Patent Specification No. 2,518,053 and German Offenlegungsschrift No. 2,233,817 state the lower limit of molecular weight for polypropylene glycols or polypropylene glycol/polyethylene glycol copolymers, for use in anti-foam formulations, to be 500, while German Auslegeschrift No. 2,222,998 even calls for a minimum molecular weight of 1,000.

Thus, according to this known prior art, only water-insoluble glycols, or glycols of a particular minimum molecular weight, come into consideration as active constituents of anti-foam formulations. However, the use of water-insoluble glycols or of glycols of relatively high molecular weight results in anti-foam agents which cannot readily be diluted with water, have a high viscosity, and are of only limited usefulness. A low viscosity facilitates the introduction of the anti-foam formulation into the medium to be freed from foam, and facilitates possible dilution, for example with water.

Furthermore, the use of polyglycols in anti-foam formulations is as a rule the more expensive, the higher the molecular weight of the diluted polyglycol proves to be and the greater the polyglycol content in the formulation is.

Ways therefore had to be sought for preparing less expensive anti-foam agents which have a lower viscosity and are more readily diluted with water, while retaining the good anti-foam activity.

It has now been found, surprisingly, that the problem described can be overcome with anti-foam formulations which essentially consist of (1) a dispersion of a silicon dioxide filler in organopolysiloxanes, (2) water-soluble compounds of the following general formulae $$R_1O(-CH_2-CH_2-O)_nR_2,$$

$$R_1O(-CH_2-CH_2O)_m R_2,$$
$$\qquad\qquad\quad |$$
$$\qquad\qquad\quad CH_3$$

$$R_1O(CH_2-CH_2-CH_2-O)_oR_2,$$

$$R_1O(CH_2-CH_2-O)_p(CH_2-CH-O)_rR_2,$$
$$\qquad\qquad\qquad\qquad\qquad\qquad |$$
$$\qquad\qquad\qquad\qquad\qquad\qquad CH_3$$

wherein $R_1$ and $R_2$ independently of one another represent hydrogen, an alkyl radical with 1–8 C atoms, or the radical

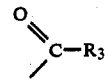

($R_3$ = an alkyl radical with 1 to 8 C atoms), and n and m, p, o and r are so chosen that the molecular weight of the particular compound does not exceed 499 and the groups identified by p and r may be present either in random distribution or in blocks, and/or water-soluble, divalent and trivalent aliphatic alcohols with 2 to 10 carbon atoms, (3) one or more emulsifiers or "dispersants" and, optionally, (4) water.

The anti-foam formulations according to the invention cannot only be prepared at little expense, but also are more easily diluted with water, have a lower viscosity and often also have a better anti-foam activity, than the known anti-foam agents corresponding to the prior art.

A suitable starting material for the anti-foam formulation according to the invention is an organopolysiloxane liquid of the general formula

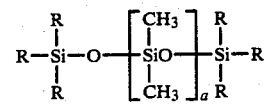

which has a viscosity in the range from about 20 to 70,000 mPas at 25° C., preferably 500 to 2,000 mPas, and wherein the R's can represent identical or different radicals which are selected from amongst optionally substituted monovalent hydrocarbon radicals, such as aliphatic, halogeno-aliphatic and cycloaliphatic radicals, for example, alkyl, alkenyl, cycloalkyl and halogenoalkyl, such as methyl, ethyl, propyl, chloroethyl, trifluoropropyl, phenyl, tolyl or benzyl, or are OH or halogen, and a is a number which suffices to give the abovementioned viscosity.

Preferably, dimethylpolysiloxanes are employed. Advantageously, R is optionally halogen-substituted $C_{1-4}$-alkyl, phenyl, OH or halogen.

It is however also possible to mix organopolysiloxanes with different radicals R and different chain lengths with one another and subsequently to prepare a dispersion of filler in the organopolysiloxane mixture.

Suitable $SiO_2$ fillers are all known, commercial $SiO_2$ fillers, which may be precipitated $SiO_2$ fillers or pyrogenically produced fillers.

The surface area, measured by the BET method, should be at least 50 $m^2/g$, preferably about 200–400 $m^2/g$.

The amounts of filler dispersed in the organopolysiloxane can be between about 1 and 15% by weight, relative to the siloxane.

The preparation of the filler/organopolysiloxane mixture can be carried out in ball mills, stirred kettles, kneaders and other suitable equipment, both at room temperature or at higher temperatures of up to about 200° C.

The preparation of the filler/organopolysiloxane mixtures is known to those skilled in the art and is not critical.

The emulsifiers used (in the case of anhydrous formulations they should more correctly be described as dispersants) are known commercial oxyethylated fatty alcohols, fatty acids, polyhydric alcohols or their derivatives or similar compounds having an active hydrogen atom, as well as fatty acid esters of polyhydric alcohols, such as, for example, the lauric acid ester of glycerol or of sorbitol. The amount of ethylene oxide which has formed an adduct with the abovementioned products can vary; it determines the hydrophilic character and hence the magnitude of the HLB value—a concept known to those skilled in the art—of the emulsifiers.

However, anionic emulsifiers, such as sodium dodecylbenzenesulphonate or sodium lauryl-sulphate, may also be used.

Preferably, an emulsifier mixture of an oxyethylated fatty alcohol and an oxyethylated triglyceride is employed, the HLB value preferably being adjusted to lie in the range from about 11 to 16.

The water-soluble glycols used to prepare the anti-foam compositions can in particular be ethylene glycols, diethylene glycols, triethylene glycols, tetraethylene glycols and polyethylene glycols and/or their derivatives, such as ethers or esters, but can also be propylene glycols of relatively low molecular weight, such as, for example, dipropylene glycol, tripropylene glycol, tetrapropylene glycol or

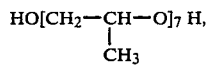

and the ethers, such as dimethyl ether, and esters, such as acetic acid ester, preparable therefrom, provided these are water-soluble. Polyoxypropylene/polyoxyethylene copolymers of relatively low molecular weight, e.g. below 425, such as for example,

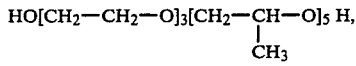

are also suitable, and in these the propylene oxide and ethylene oxide units may be present in random distribution or in blocks.

Water-soluble aliphatic, dihydric alcohols, such as, for example, propane-1,2-diol, propane-1,3-diol, butane-diols, hexanediols and the like, or trihydric alcohols, such as, for example, trimethylolpropane, glycerol and the like, are also suitable for the preparation of the anti-foam compositions. Furthermore, mixtures of the glycols mentioned and/or their derivatives (for example ethers or esters) and/or their copolymers are also to be understood as included amongst the additives according to the invention.

The addition of water to the anti-foam formulations is optional. As a rule, it results in greater ease of dilution of the formulations with water. Water can be added in up to about 70% by weight, preferably up to about 45% by weight, relative to the total mixture.

The preparation of the anti-foam formulations according to the invention can be carried out by first preparing the organopolysiloxane-filler dispersion in the manner described above. This dispersion is subsequently mixed in a mixing apparatus, for example a stirred kettle, with the emulsifiers or "dispersants", at room temperature or temperatures of up to about 100° C., preferably 60°–70° C. Thereafter, glycol and, if required, water is added.

It is also possible to homogenize organopolysiloxane-filler dispersions and emulsifiers, and, optionally, water, and only then to add the glycol or glycol/water.

Vigorous homogenisation of the formulations thus produced is effected, for example, by means of commercial, rapidly rotating colloid mills or by means of homogenisers working with high compression.

The quantitative composition of the anti-foam agents according to the invention is approximately the following: anti-foam agent ($SiO_2$/polysiloxanes): 10–40% by weight, preferably 25–35% by weight; water-soluble compound: 45–84% by weight, preferably 53–67% by weight; emulsifier: 6–15% by weight, preferably 8–12% by weight.

The foam-inhibiting action of the anti-foam formulations can be tested in the following manner:

A surfactant solution is prepared from a commercial alkylsulphonate and contains 5 g/l of the latter.

0.1 ml of a 10% strength by weight anti-foam agent dilution (0.00288 g of silicone/100 ml of alkylsulphonate solution) and 0.5 and 0.25 ml of a 1% strength by weight anti-foam dilution (respectively 0.0014 g and 0.00072 g of silicone/100 ml of alkylsulphonate solution) are pipetted into a commercial graduated foam-measuring vessel (Schlachter-Dirkes design) and made up with 100 ml of alkylsulphonate solution containing 5 g/l of alkylsulphonate. The solution thus introduced is whisked 50 times in the course of 35 seconds by means of a pneumatically driven whisk. The ram of the whisk is screwed onto a metal rod of 12 mm diameter, consists of silicone rubber and has a diameter of 42 mm and a thickness of 3 mm. It has 10 holes of 5 mm diameter at equidistant intervals.

The foam height immediately after the end of the whisking time, and the time for the foam to collapse until it reaches the 100 ml mark (height of the liquid level) are determined, and the values obtained are compared.

The ease of dilution of the anti-foam formulations with water is tested by preparing a 10% strength by weight aqueous dilution of the anti-foam formulations. For this, the water and the anti-foam agent are mixed by brief stirring in a beaker. This should result in a fine emulsion which after standing for 20 minutes shows no greasy lumpy deposits. Any creaming which occurs should be redispersible by shaking.

The viscosities of the anti-foam agents are determined by means of a Haake falling ball viscometer, in accordance with DIN No. 53,015.

In the first five examples given below, anti-foam formulations according to the invention are compared, in respect of anti-foam activity, ease of dilution with water, and viscosity, with formulations which, while otherwise having the same composition, contain water-insoluble glycols or no glycols at all.

The anti-foam agents A, B and C according to the invention, of Example 1, are more easily diluted with water than the comparison anti-foam agents D and E, and also have a better anti-foam activity. Example F shows that the addition of glycol greatly increases the anti-foam action.

The anti-foam compositions A, B and C according to the invention, used in Examples 2 and 3, also show greater ease of dilution with water than those of the comparison examples. The anti-foam agent G, Example 3, contains no glycol. The anti-foam action of the anti-foam agents according to the invention corresponds at least to that of the comparison examples, and is in part even better.

The anti-foam formulations 4A to 4E according to the invention are more easily diluted with water than Comparison Example 4F. The anti-foam formulation 4F cannot be used because of the marked inhomogeneity.

In Example 5, the ease of dilution with water, and anti-foam action, of the anti-foam agents A, B and C according to the invention are better than those of Comparison Example C. The viscosity of the anti-foam agents according to the invention is lower than that of the comparison examples (Example 4A must be compared with 4F, and 5A with 5D).

mm Hg, while stirring. The mixture obtained is a so-called "anti-foam composition".

A. 150 g of anti-foam composition are heated to 65° C., while stirring. 7.5 g of oxyethylated triglyceride, HLB value 18.1, and 42.5 g of oxyethylated tridecyl alcohol, HLB value 11.4, are then added. After the mixture has cooled to 40° C., 300 g of tripropylene glycol, molecular weight 192, are added.

After stirring for a further 30 minutes, the anti-foam formulation is homogenized twice under 200 bar by means of a commercial homogenizing machine (Gann machine, Type HE 150, No. 1687).

B. Procedure and amounts as under A, except that in place of the tripropylene glycol 300 g of polypropylene glycol, molecular weight 423, are employed.

C. Procedure and amounts as under A, except that in place of the tripropylene glycol 300 g of ethylene glycol are employed.

COMPARISON EXAMPLES

D. Procedure and amounts as under A, except that tripropylene glycol is replaced by polypropylene glycol, molecular weight 1,000.

E. Procedure and amounts as under A, except that tripropylene glycol is replaced by polypropylene glycol, molecular weight 2,000.

F. Procedure and amounts as under A, but glycol is replaced by water.

Table I which follows provides information on the anti-foam activity, ease of dilution with water and viscosity of the anti-foam agents A-F.

TABLE I

| Example | Ease of dilution with water | Anti-foam action foam height (ml)/ foam collapse time (s)* | | | Viscosity [mPas] |
|---|---|---|---|---|---|
| | | 0.00288 g+ | 0.00144 g+ | 0.00072 g* | |
| Anti-foam formulations according to the invention | | | | | |
| A | good; fine emulsion, no deposits | 50/<3* | 50/<3 | 50/5 | 602 |
| B | average; however, very fine particles are deposited on the glass wall | 50/<3 | 50/7 | 100/35 | 875 |
| C | average; however, very fine particles are deposited on the glass wall | 40/<3 | 50/6 | 100/27 | 253 |
| Comparison Examples | | | | | |
| D | not good, large silicone particles are deposited on the vessel wall | 50/<3 | 50/11 | 100/87 | 1,900 |
| E | very poor, very large lumps are deposited in solution and on the vessel wall | Anti-foam action cannot be determined because of lump formation | | | 3,130 |
| F | good, no deposit | 100/55 | 200/>120 | 250/120 | 100 |

*the first figures gives the foam height in ml and the second figures the foam collapse time in s
+g of silicone/100 ml of alkylsulphonate solution

EXAMPLE 1

846 g of a liquid polydimethylsiloxane having a viscosity of 1,400 mPas, 18 g of a polydimethylsiloxane containing SiOH groups in an amount of 18% by weight, and having a viscosity of 30 mPas, and 36 g of a commercial pyrogenic silica having a surface area, determined by the BET method, of 380 m²/g, are mixed for 2 hours in a ball mill. Thereafter, this composition is devolatilized by heating for 3 hours at 130° C. and 14

EXAMPLE 2

The "anti-foam composition" is prepared as in Example 1.

A. 150 g of anti-foam composition are warmed to 65° C., while stirring. 7.5 g of oxyethylated triglyceride and 42.5 g of oxyethylated tridecyl alcohol, as in Example 1A, are then added.

180 g of tripropylene glycol are metered into this mixture; after 15 minutes' stirring, 120 g of water are introduced, again in the course of 15 minutes. Homogenization as in Example 1.

B. Procedure and amounts as under A, except that in place of the tripropylene glycol 180 g of polypropylene glycol molecular weight 423, are employed.

C. Procedure and amounts as under A, except that 180 g of ethylene glycol are employed.

COMPARISON EXAMPLES

D. Procedure as under A, except that 180 g of polypropylene glycol, molecular weight 1,000, are employed.

E. Procedure and amounts as under A, except that 180 g of polypropylene glycol, molecular weight 2,000, are employed.

COMPARISON EXAMPLES

D. Like 3A, except that in place of 90 g of ethylene glycol a mixture of 45 g of ethylene glycol and 45 g of polypropylene glycol, molecular weight 2,000, is employed.

E. Like 3A, except that, in place of 90 g of ethylene glycol, 45 g of ethylene glycol and 45 g of polypropylene glycol, molecular weight 4,000, are employed.

F. Like 3A, except that, in place of 90 g of ethylene glycol, 90 g of polypropylene glycol, molecular weight 2,000, are employed.

TABLE III

| Example | Ease of dilution with water | Anti-foam action foam height [ml]/ foam collapse time [s] | | | Viscosity [mPas] |
|---|---|---|---|---|---|
| | | 0.00288 g | 0.00144 g | 0.00072 g | |
| Anti-foam formulations according to the invention | | | | | |
| A | good, no deposits | 60/12 | 100/98 | 200/120 | 223 |
| B | good, no deposits | 50/4 | 50/5 | 50/23 | 140 |
| C | good, no deposits | 50/4 | 100/23 | 100/69 | 113 |
| Comparison Examples | | | | | |
| D | less good, fine deposits | 60/14 | 100/89 | 200/120 | 499 |
| E | very poor, formation of lumps | 50/8 | 100/52 | 200/120 | 437 |
| F | very poor, lumps in emulsion | 50/4 | 50/15 | 50/73 | 1,465 |
| G | good, no deposits | 120/113 | 250/120 | 300/120 | 82 | are employed.
Table II shows the results.

TABLE II

| Example | Ease of dilution with water | Anti-foam action foam height (ml)/ foam collapse time [s] | | | Viscosity [mPas] |
|---|---|---|---|---|---|
| | | 0.00288 g | 0.00144 g | 0.00072 g | |
| Anti-foam formulations according to the invention | | | | | |
| A | good; no deposits | 50/<3 | 50/7 | 100/37 | 133 |
| B | good; no deposits | 50/<3 | 50/8 | 100/48 | 218 |
| C | good; no deposits | 40/<3 | 50/5 | 100/19 | 159 |
| Comparison Examples | | | | | |
| D | poorer than in A–C, very fine particles deposit | 60/3 | 50/3 | 50/8 | 752 |
| E | very poor, lump formation, extensive deposition of caked greasy agglomerates | No measurement possible, due to lump formation | | | 1,866 |

EXAMPLE 3

The "anti-foam composition" is prepared as in Example 1.

A. 150 g of anti-foam composition are warmed to 65° C., while stirring. 22.4 g of oxyethylated triglyceride and 27.6 g of oxyethylated tridecyl alcohol, as in Example 1, are then added.

90 g of ethylene glycol are added to this mixture and the batch is stirred for 15 minutes. 210 g of water are then added in the course of a further 15 minutes. Homogenization as in Example 1.

B. Like 3A, except that in place of 90 g of ethylene glycol, a mixture of 45 g of ethylene glycol and 45 g of tripropylene glycol is employed.

C. Like 3A, except that in place of 90 g of ethylene glycol, a mixture of 45 g of ethylene glycol and 45 g of polypropylene glycol, molecular weight 423, is employed.

EXAMPLE 4

The "anti-foam composition" is prepared as in Example 1.

A. 150 g of anti-foam composition are warmed to 65° C., while stirring. 7.5 g of oxyethylated triglyceride and 42.5 g of oxyethylated tridecyl alcohol, as in Example 1, are then added.

After this batch has cooled to 40° C., 150 g of tetraethylene glycol and 150 g of tripropylene glycol are stirred in. Homogenization analogous to Example 1.

B. Procedure and amounts as under A, except that in place of 150 g of tetraethylene glycol and 150 g of tripropylene glycol, 180 g of diethylene glycol, followed by 120 g of water, are employed.

Homogenization analogous to Example 1.

C. Like Example 4B, except that, in place of 180 g of diethylene glycol, 180 g of triethylene glycol are employed.

D. Like Example A, except that, in place of the glycol employed there, 150 g of diethylene glycol and 150 g of polypropylene glycol, molecular weight 423, are added to the batch.

E. Like Example A, except that, in place of the glycols employed in A, 150 g of octaethylene glycol and 150 g of polypropylene glycol, molecular weight 423, are added.

COMPARISON EXAMPLE

F. Like Example A, except that in place of the tripropylene glycol, polypropylene glycol, molecular weight 2,000, is employed.

ated tridecyl alcohol, as in Example 1A. After the mixture has cooled, 300 g of a copolymer which has been prepared using trimethylolpropane as the starter, contains 33.3% by weight of propylene glycol units and 66.7% by weight of ethylene glycol units, and has a molecular weight of 265, are mixed in. Homogenization as in Example 1A.

COMPARISON EXAMPLE

D. Like A, except that in place of the copolymer described there, 90 g of a copolymer composed of 70%

TABLE IV

| Example | Ease of dilution with water | Anti-foam action foam height [ml]/ foam collapse time [s] | | | Viscosity [mPas] |
|---|---|---|---|---|---|
| | | 0.00288 g | 0.00144 g | 0.00072 g | |
| Anti-foam formulations according to the invention | | | | | |
| A+ | mediocre, slight deposits observable | 50/4 | 50/16 | 150/96 | 1,404 |
| B | mediocre, slight deposits observable | 50/3 | 50/4 | 50/10 | 158 |
| C | mediocre, slight deposits observable | 50/3 | 50/6 | 50/14 | 191 |
| D | mediocre, slight deposits obervable | 50/5 | 50/8 | 100/30 | 511 |
| E | mediocre, slight deposits observable | 50/3 | 100/25 | 250/63 | 303 |
| Comparative Example | | | | | |
| F+ | very poor, extensive lump formation, deposits of large cowpat-like agglomerates | measurements not possible, due to lump formation | | | 2,225 |

EXAMPLE 5

The "anti-foam composition" is prepared as in Example 1.

by weight of propylene glycol units and 30% by weight of ethylene glycol units, and having a molecular weight of 2,000, are employed.

The results are shown in Table V.

TABLE V

| Example | Ease of dilution with water | Anti-foam action foam height [ml]/ foam collapse time [s] | | | Viscosity [mPas] |
|---|---|---|---|---|---|
| | | 0.00288 g+ | 0.00144 g+ | 0.00072 g+ | |
| Anti-foam formulations according to the invention | | | | | |
| A | good, only very slight deposits | 50/3ˣ | 50/5 | 50/11 | 74* |
| B | good, only very slight deposits | 50/3 | 50/4 | 50/7 | 231 |
| C | good, no deposits | 50/3 | 50/5 | 50/20 | 5,562 |
| Comparison Example | | | | | |
| D | moderate, extensive deposits | 50/4 | 50/9 | 100/36 | 190* |

Notes:
+g of silicone/100 ml of alkylsulphonate solution
ˣthe first figure in each case indicates the foam height, and the last figure the foam collapse time
*Examples A and D must be compared.

A. 150 g of anti-foam composition are mixed with 7.5 g of oxyethylated triglyceride and 42.5 g of oxyethylated tridecyl alcohol, as in Example 1A. After the mixture has cooled, 90 g of a copolymer which has been prepared using trimethylolpropane as a starter, contains 70% by weight of propylene glycol and 30% by weight of ethylene glycol units, and has a molecular weight of 445, are added.

210 g of water are then added. Homogenization as in Example 1A.

B. Like A, except that 180 g of copolymer and 120 g of water are employed.

C. 150 g of anti-foam composition are mixed with 7.5 g of oxyethylated triglyceride and 42.5 g of oxyethyl-

EXAMPLE 6

The anti-foam composition is prepared as in Example 1.

A. 150 g of anti-foam composition are mixed with 7.5 g of oxyethylated triglyceride and 42.5 g of oxyethylated tridecyl alcohol, as in Example 1A. After cooling, a mixture of 90 g of ethylene glycol and 90 g of propane-1,2-diol is added, in portions. 120 g of water are then added. Homogenization as in Example 1A.

B. 150 g of anti-foam composition are mixed with 22.4 g of oxyethylated triglyceride and 27.6 g of oxyethylated tridecyl alcohol, as in Example 3A. Thereafter, a mixture of 90 g of ethylene glycol and 90 g of glycerol is added, followed by 120 g of water. Homogenization as in Example 1A.

C. 150 g of anti-foam composition are mixed with 7.5 g of oxyethylated triglyceride, and 42.5 g of oxyethylated tridecyl alcohol, as in Example 1A. After the mixture has cooled, 90 g of ethylene glycol methyl ether acetate are added, followed by 210 g of water. Homogenization as in Example 1A.

D. Like 6C, except that, in place of the ethylene glycol methyl ether acetate, 90 g of butane-1,2-diol are used.

E. Like 6C, except that, in place of the ethylene glycol methyl ether acetate, 90 g of diethylene glycol dimethyl ether are employed.

The values obtained are shown in Table VI.

TABLE VI

| Example | Ease of dilution with water | Anti-foam action foam height [ml]/ foam collapse time [s] | | | Viscosity [mPas] |
|---|---|---|---|---|---|
| | | 0.00288 g | 0.00144 g | 0.00072 g | |
| A | good, very slight deposits | 50/4 | 50/11 | 100/49 | 118 |
| B | good, no deposits | 70/10 | 100/55 | 200/120 | 444 |
| C | good, no deposits | 50/3 | 50/5 | 50/12 | 30 |
| D | good, no deposits | 50/3 | 50/4 | 50/20 | 68 |
| E | good, no deposits | 50/4 | 50/12 | 100/49 | 59 |

It will be appreciated that the instant specification and examples are set forth by way of illustration and not limitation, and that various modifications and changes may be made without departing from the spirit and scope of the present invention.

We claim:

1. An anti-foam composition comprising by weight approximately
  (a) 10 to 40% of a dispersion of a silicon dioxide filler in an organopolysiloxane,
  (b) 6 to 15% of an emulsifier or dispersant, and
  (c) 45 to 84% of at least one water soluble compound selected from the group consisting of
    (i) a divalent aliphatic alcohol containing 4 to 10 carbon atoms,
    (ii) a trivalent aliphatic alcohol containing 2 to 10 carbon atoms, and

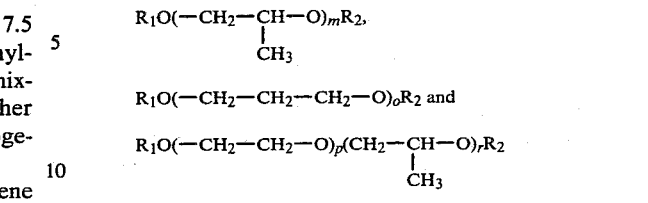

in which
  $R_1$ and $R_2$ each independently is hydrogen, $C_{1-8}$-alkyl or $C_{1-8}$-alkyl-CO-, and
  n,m,p,o and r are so chosen that the molecular weight of (c) does not exceed 425.

2. A composition according to claim 1, wherein the water-soluble compound (c) comprises polypropylene glycol.

3. A composition according to claim 1, wherein the water-soluble compound (c) comprises tripropylene glycol.

4. A composition according to claim 1, wherein (a) comprises about 1 to 15% by weight of silica, and at least one organopolysiloxane of the formula

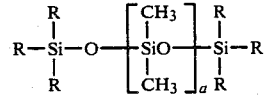

having a viscosity of about 20 to 70,000 mPas at 25° C. and wherein
  R each independently is OH, halogen or an optionally halogenated monovalent hydrocarbon radical, and
  a is a number which suffices to give the indicated viscosity.

5. A composition according to claim 1, additionally containing water in up to about 70% by weight of the total composition.

6. A composition according to claim 4, wherein based on (a) plus (b) plus (c) the composition by weight comprises about 25 to 35% (a), about 8 to 12% (b) and about 53 to 67% (c), the composition additionally containing water in up to about 45% by weight of the entire composition.

* * * * *